United States Patent [19]

Meynckens et al.

[11] Patent Number: 5,780,114
[45] Date of Patent: Jul. 14, 1998

[54] PRODUCTION OF A SILICEOUS REFRACTORY MASS

[75] Inventors: Jean-Pierre Meynckens, Villers-Perwin; Bernard Somerhausen, Nivelles, both of Belgium

[73] Assignee: Glaverbel, Brussels, Belgium

[21] Appl. No.: 849,305

[22] PCT Filed: Nov. 23, 1995

[86] PCT No.: PCT/BE95/00108

§ 371 Date: May 27, 1997

§ 102(e) Date: May 27, 1997

[87] PCT Pub. No.: WO96/16917

PCT Pub. Date: Jun. 6, 1996

[30] Foreign Application Priority Data

Nov. 28, 1994 [GB] United Kingdom .................. 9423984
Dec. 22, 1994 [GB] United Kingdom .................. 9425927

[51] Int. Cl.$^6$ .......................... C04B 35/02; C04B 35/60
[52] U.S. Cl. .......................... 427/422; 427/427; 264/30; 501/133; 501/154
[58] Field of Search ..................... 423/335, 337; 501/133, 154, 94; 264/30; 427/422, 427

[56] References Cited

U.S. PATENT DOCUMENTS

| | | |
|---|---|---|
| 1,420,284 | 6/1922 | Rebuffat .................. 501/133 |
| 1,969,750 | 8/1934 | Heuer ..................... 501/133 |
| 2,741,822 | 4/1956 | Udy . |
| 2,901,367 | 8/1959 | Kraner .................... 501/133 |
| 3,684,560 | 8/1972 | Brichard .................. 264/30 |
| 4,073,655 | 2/1978 | Li . |
| 4,542,888 | 9/1985 | Robyn et al. ............. 264/30 |
| 4,792,468 | 12/1988 | Robyn et al. ............ 264/30 |
| 4,818,729 | 4/1989 | Perrotta et al. . |
| 4,866,015 | 9/1989 | Koschlig et al. ......... 501/133 |
| 4,920,084 | 4/1990 | Robyn et al. ............ 501/125 |
| 4,988,649 | 1/1991 | Santowski et al. ....... 501/154 |
| 5,002,910 | 3/1991 | Robyn .................... 264/30 |
| 5,310,708 | 5/1994 | Harako et al. ........... 501/133 |

FOREIGN PATENT DOCUMENTS

| | | |
|---|---|---|
| 61-058867 | 3/1986 | Japan . |
| 405004864 | 1/1993 | Japan . |
| 06345528 | 12/1994 | Japan . |
| 61468 | 7/1976 | Romania . |
| 2001036 | 10/1993 | Russian Federation . |
| 2003017 | 11/1993 | Russian Federation . |
| 1330894 | 9/1973 | United Kingdom . |
| 2170191 | 7/1986 | United Kingdom . |
| 2257136 | 1/1993 | United Kingdom . |

OTHER PUBLICATIONS

"X-Ray Diffraction Analysis of SiO$_2$ Crystals in High Duty Silica bricks" Zhang Boli Yu Tangci 21(4), 20-6, 1993.
"Increasing the Productivity of Cake Ovens With Densely Sintece Silica bricks" Weskamp et al. Glueckauf 121(22), 1715-18, 1985.

*Primary Examiner*—Paul Marcantoni
*Attorney, Agent, or Firm*—Spencer & Frank

[57] ABSTRACT

A process for producing a crystalline siliceous refractory mass includes providing particulate constituents to be projected comprised of (1) solid refractory particles comprising silica in the form of vitreous silica, and (2) solid combustible particles comprising silicon particles; projecting the particulate constituents with gaseous oxygen against a surface under ceramic welding conditions effective to cause a reaction between the solid combustible particles and the gaseous oxygen to occur against the surface, thereby releasing the heat of reaction against the surface so that a coherent refractory mass comprising cristobalite is formed, wherein the surface against which the solid refractory particles are projected is at a temperature of at least 1000° C. The process can be used to manufacture refractory bricks or blocks, to repair furnaces, or to repair worn surfaces of a siliceous refractory material.

21 Claims, No Drawings

PRODUCTION OF A SILICEOUS REFRACTORY MASS

BACKGROUND OF THE INVENTION

1. Field of the Invention

The present invention relates to a process for making a crystalline siliceous refractory mass comprising cristobalite. This process may be for the purpose of producing the mass as such, for example in making refractory building bricks or blocks to be used in the construction or repair of furnaces, or may be a process for in situ repairing a worn surface of a siliceous refractory material, for example in industrial furnaces such as glassmaking furnaces.

2. Description of the Related Art

The process uses a technique of the type generally known as "ceramic welding", in which a mixture of solid refractory particles and solid combustible fuel particles of a metal or semi-metal such as aluminum and silicon are projected against the surface to be repaired and are there reacted with oxygen-rich gas, usually substantially pure oxygen, such that the heat of reaction of the fuel is released against the surface so that a coherent refractory repair mass is formed.

Such "ceramic welding" is described in GB patent 1,330,894 (Glaverbel) and GB 2,170,191 (Glaverbel), in which a coherent refractory mass is formed against a surface by projecting onto the latter a mixture of refractory particles and combustible particles in the presence of oxygen. The combustible particles are particles whose composition and granulometry are such that they react in an exothermic manner with the oxygen to form a refractory oxide while releasing the necessary heat for melting, at least superficially, the projected refractory particles. The projection of particles is conveniently and safely achieved by using the oxygen as a carrier gas for the particle mixture. In this manner a coherent refractory mass is formed against the surface onto which the particles are projected.

These known ceramic welding processes can be employed for forming a refractory article, for example, a block having a particular shape, but they are most widely used for forming coatings or for repairing bricks or walls and are particularly useful for repairing or reinforcing existing refractory structures, for example, furnace walls in glassmaking or coke furnaces.

The process is particularly suitable for the repair of a hot substrate surface. This makes it possible to repair worn surfaces while the equipment remains substantially at its working temperature and in many cases while the furnace as a whole remains in operation. Such repairs while the furnace remains in use are especially useful in glassmaking and coke ovens since the intended life of the furnace is measured in years, often as long as twenty years, with the furnace being maintained continuously in operation over the whole period.

The composition of the ceramic welding mixture is generally selected to produce a repair mass which has a chemical composition similar or close to that of the basic refractory. This helps to ensure compatibility with and adhesion to the new material and the base material on which it is formed.

Even with such chemical compatibility there can however be a problem in ensuring adhesion of the repair mass to the substrate, especially if the adhesion is to be maintained over prolonged periods. The problem tends to increase if the repaired surface is subjected to very high temperatures. In this case a high grade refractory is necessary, as for example for the vault of a glass tank.

The breaking away of a repair mass is to be avoided if at all possible. In glassmaking the broken mass is likely to fall into the molten glass and introduce unacceptable impurities, sometimes necessitating a huge batch of molten glass to be discarded.

SUMMARY OF THE INVENTION

We have now found that highly refractory masses comprising cristobalite can be easily formed, provided that the temperature is maintained at a very high level, from a solid refractory particulate material which has traditionally been avoided on the ground that it would be incompatible with the base material. Specifically the material which according to the present invention can now be used for successful repairs is vitreous silica.

According to the present invention there is provided a process for producing a crystalline siliceous refractory mass by projecting gaseous oxygen, solid refractory particles and solid combustible particles comprising silicon particles against a surface in such a way that reaction between the combustible particles and gaseous oxygen occurs against the surface, thereby releasing the heat of reaction against the surface so that a coherent refractory mass comprising cristobalite is formed, characterised in that the solid refractory particles comprise silica in the form of vitreous silica and in that the surface against which they are projected is at a temperature of at least 1000° C.

The high temperature of the surface ensures that silica formed by the combustion of silicon particles is incorporated into a crystalline lattice in the refractory mass.

The presence of the crystalline lattice creates several advantages with regard to the internal cohesion of the refractory mass and to its ability to adhere, if so required, to a surface under repair. The explanation given herein for how these advantages are achieved is in the nature of a hypothesis. Regardless of the accuracy of the hypothesis the advantages have however been clearly shown in practical application of the invention.

It is believed that the crystalline lattice acts as a binder phase extending through the refractory mass. The lattice creates a continuous structure extending across the whole of the mass, making for a dense structure with high mechanical strength. If the process is used to repair a worn refractory surface the crystalline lattice extends to and adheres to the surface.

The projected refractory particles can have a different structure from that of the binder phase. The adhesion to the surface is essentially provided by the binder phase.

Exposure of a refractory mass to very high temperatures in situ in a hot furnace transforms the mass into cristobalite. In the case of formation of a discrete refractory block or brick, for example by projection into a mould, the formed refractory mass is preferably fired at a temperature of at least 1000° C. The high furnace temperature and the firing transform the residual vitreous phase into cristobalite. This has the particular advantage that crystobalite is stable at high temperatures.

The process of the invention is especially well suited for use in the in situ repair of glassmaking furnaces because of the very high temperatures that can be encountered therein. For example the vault surface temperature above the glass melting tank may be greater than 1500° C.

The particle mixture employed for the present invention, namely a mixture of solid combustible particles and of solid refractory particles comprising vitreous silica, can be used in the repair of surfaces at temperatures below 1000° C., provided that the mixture includes an additive as defined in GB patent application 2257136 (Glaverbel).

The silica for use in the present invention should be of high purity, for example at least 95% pure oxide by weight, preferably at least 99% pure oxide by weight. The mass obtained is highly refractory and reduces the risks of pollution in a glassmaking tank if any of the mass should fall into the glass.

Vitreous silica is advantageous as the solid refractory particles for use in the process of the invention, both because of its easy availability and because it can readily be obtained in a high degree of purity.

The total quantity of silicon is preferably not more than 15% by weight. This is desirable to limit the amount of unreacted fuel which may remain in the formed refractory mass since the presence of a significant proportion of unreacted fuel in the formed refractory mass may impair its quality.

The refractory particles preferably comprise substantially no particles with a size greater than 4 mm, most preferably not greater than 2.5 mm, in order to facilitate the smooth projection of the powder. The size range spread factor f(G) of the refractory particles is preferably not less than 1.2. The said factor f(G) is used herein in relation to a given species of particles to denote the factor:

$$f(G) = \frac{2(G_{80} - G_{20})}{(G_{80} + G_{20})}$$

where $G_{80}$ denotes the 80% grain size of the particles of that species and $G_{20}$ denotes the 20% grain size of the particles of that species.

The silicon preferably has an average particle diameter not greater than 50 µm. The term "average particle diameter" as employed herein denotes a dimension such that 50% by weight of the particles have a smaller dimension than this average.

The melting point of refractory masses obtained according to the process of the invention approaches that of pure silica. Bricks produced according to the invention have a cristobalite structure and a deformation coefficient $T_{0.5}$ according to ISO Standard R1893 of more than 1650° C. This compares with $T_{0.5}$ of about 1550° C. for ordinary silica bricks prepared by a conventional process. Refractory bricks consisting predominantly of stabilized high-cristobalite solid solution (i.e. silica wherein part of Si is replaced by Al with Ca or Ca plus other cations) obtained according to U.S. Pat. No. 4,073,655 (Owens-Illinois, Inc.) by devitrification of a glass, are suitable for use at a temperature of up to about 1250° C.

DESCRIPTION OF THE PREFERRED EMBODIMENTS

The invention is illustrated below with reference to the following examples. It is however stressed that the invention is not limited to the specific quantities and procedures described therein.

EXAMPLE 1

A mixture of (by weight) 88% of vitreous silica particles, having a purity of 99.7% silica, and 12% silicon particles was projected in a stream of commercially pure oxygen against the vault of a glassmaking tank to form a refractory mass thereon. The vault was at a temperature of about 1600° C. The maximum particle size of the vitreous silica was 2 mm. Its $G_{80}$ was 950 µm and its $G_{20}$ was 225 µm, giving a size range spread factor f(G) of 1.23. The silicon particles had an average particle diameter of less than 45 µm and a specific surface area between 2,500 and 8,000 cm²/g. After six days a sample of the formed mass was removed for analysis and was found to have the following properties:

| Melting point | 1723° C. |
|---|---|
| Structure | cristobalite |
| $T_{0.5}$ (ISO R1893) | almost 1700° C.* |

*The best commercially available bricks normally used at this location in the vault (Hepworth Refractories' "HEPSIL SV" high purity silica bricks) have a $T_{0.5}$ of 1640° C.

EXAMPLE 2

A powder mixture of the same composition as in Example 1 was projected in a stream of commercially pure oxygen into a mould so as to form a brick. The mould was preheated to 1600° C. to receive the powder mixture. After the brick had been formed it was maintained at 1450° C. for 6 days. The brick was then analysed and was found to have the same melting point, structure, and $T_{0.5}$ as the Example 1 sample.

Bricks such as those produced according to Example 2 can be employed directly and with no special precautions in the repair of a worn-out vault of a glass furnace, if necessary with additional welding. Any other type of crystalline silica brick placed in the same conditions without precautions such as careful pre-heating will immediately suffer extensive cracking.

What is claimed is:

1. A process for producing a crystalline siliceous refractory mass comprising:
   a. providing particulate constituents to be projected comprised of
      (1) solid refractory particles comprising silica in the form of vitreous silica, and
      (2) solid combustible particles comprising silicon particles;
   b. projecting the particulate constituents with gaseous oxygen against a surface under ceramic welding conditions effective to cause a reaction between the solid combustible particles and the gaseous oxygen to occur against the surface, thereby releasing the heat of reaction against the surface so that a coherent refractory mass comprising cristobalite is formed,
   wherein the surface against which the solid refractory particles are projected is at a temperature of at least 1000° C.

2. The process as claimed in claim 1, further comprising firing the resultant coherent refractory mass at a temperature of at least 1000° C.

3. The process as claimed in claim 1, wherein the solid refractory particles are composed of silica having a purity of at least 95% by weight.

4. The process as claimed in claim 1, wherein the solid refractory particles are composed of silica having a purity of at least 99% by weight.

5. The process as claimed in claim 1, wherein the particulate constituents projected have a total weight, and wherein the silicon is present in a total quantity which is not more than 15% by weight of the total weight of the particulate constituents projected.

6. The process as claimed in claim 1, wherein the silicon has an average particle diameter which is not greater than 50 µm.

7. The process as claimed in claim 1, wherein the solid refractory particles comprise substantially no particles with a size greater than 4 mm.

8. The process as claimed in claim 1, wherein the solid refractory particles have a size range spread factor f(G) which is not less than 1.2.

9. The process as claimed in claim 2, wherein the solid refractory particles are composed of silica having a purity of at least 95% by weight.

10. The process as claimed in claim 2, wherein the solid refractory particles are composed of silica having a purity of at least 99% by weight.

11. The process claimed in claim 2, wherein the particulate constituents projected have a total weight, and wherein the silicon is present in a total quantity which is not more than 15% by weight of the total weight of the particulate constituents projected.

12. The process as claimed in claim 2, wherein the silicon has an average particle diameter which is not greater than 50 μm.

13. The process as claimed in claim 2, wherein the solid refractory particles comprise substantially no particles with a size greater than 4 mm.

14. The process as claimed in claim 2, wherein the solid refractory particle have a size range spread factor f(G) which is not less than 1.2.

15. A refractory brick having a cristobalite structure and having a deformation coefficient $T_{0.5}$ of more than 1650° C. which is prepared by the process as defined in claim 1.

16. A refractory brick having a cristobalite structure and having a deformation coefficient $T_{0.5}$ of more than 1650° C. which is prepared by the process as defined in claim 2.

17. A refractory brick having a cristobalite structure and having a deformation coefficient $T_{0.5}$ of more than 1650° C. which is prepared by a process as defined in claim 3.

18. A refractory brick having a cristobalite structure and having a deformation coefficient $T_{0.5}$ of more than 1650° C. which is prepared by a process as defined in claim 4.

19. A refractory brick having a cristobalite structure and having a deformation coefficient $T_{0.5}$ of more than 1650° C. prepared which is by a process as defined in claim 9.

20. A refractory brick having a cristobalite structure and having a deformation coefficient $T_{0.5}$ of more than 1650° C. which is prepared by a process as defined in claim 10.

21. The process as claimed in claim 1, wherein the coherent refractory mass formed consists essentially of cristobalite.

* * * * *